Patented Apr. 9, 1946

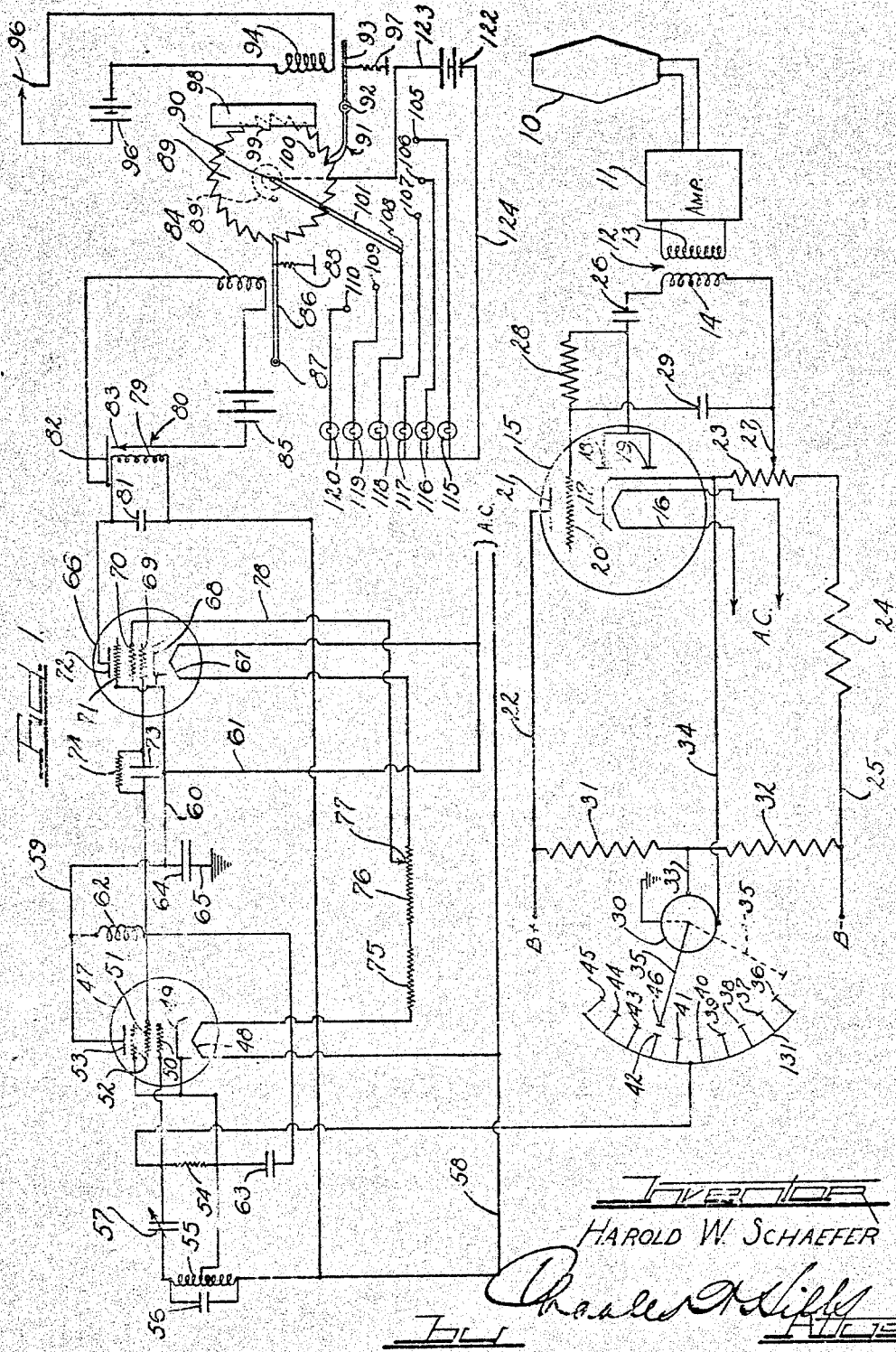

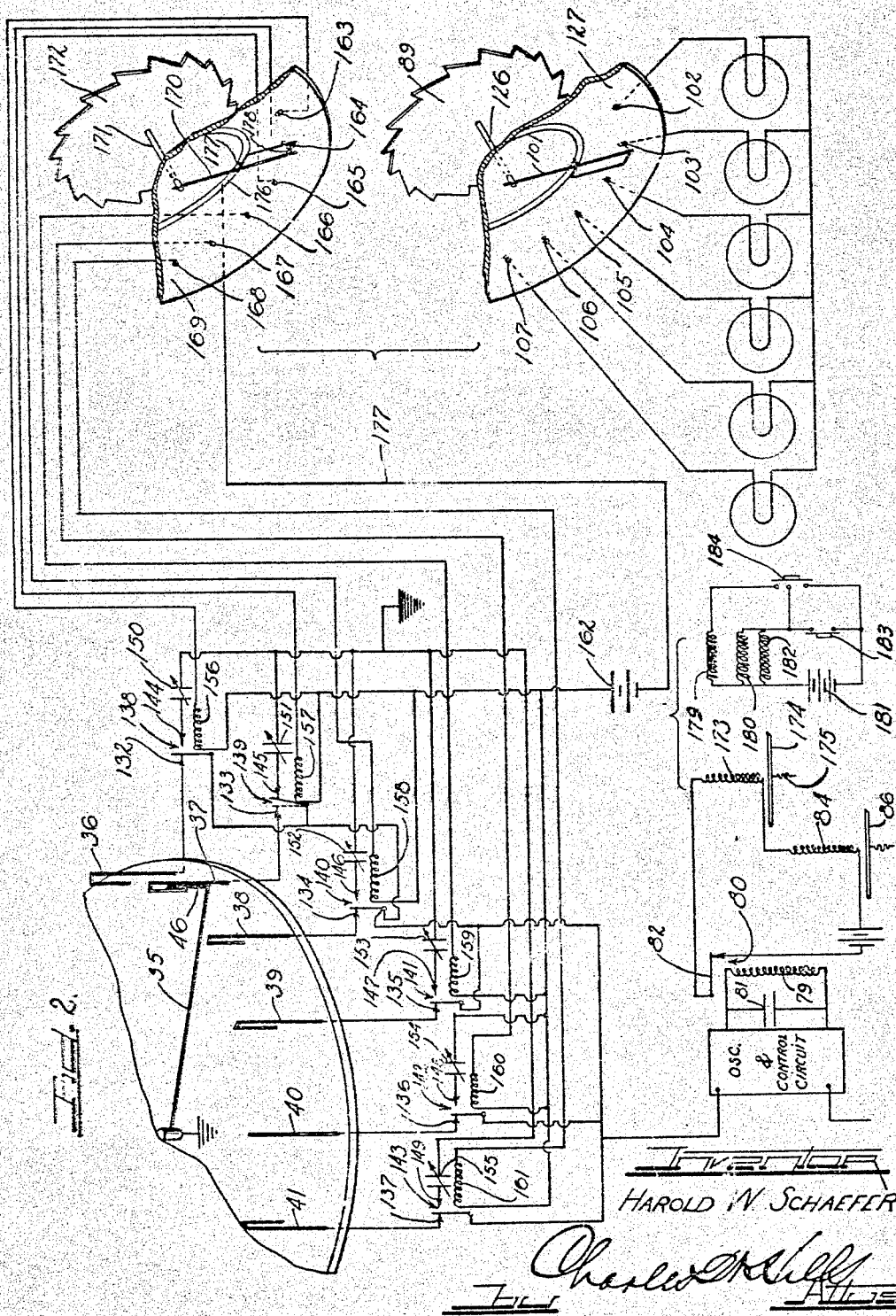

2,398,046

UNITED STATES PATENT OFFICE 2,398,046

INDICATING APPARATUS AND METHOD

Harold W. Schaefer, Chicago, Ill., assignor to The Harry Alter Company, Chicago, Ill., a corporation of Illinois Application January 19, 1942, Serial No. 427,353

2 Claims. (Cl. 177—351)

This invention relates to an indicating means and method, and more particularly to an indicating means and method which employs insertion and removal of capacity reactance in a control circuit for indicating the position or condition of a registering means.

Many arrangements have been provided in the past for indicating conditions or registering the position of a recording or indicating means. The present invention contemplates a particular type of arrangement which includes the novel use of capacity reactance means for effecting the desired indication. In the illustrated embodiments of the invention presently to be described, capacity is intermittently inserted in an oscillator circuit which circuit in turn causes a series of intermittent surges of current to flow through the energizing winding of a relay which operates and controls a counter or indicating means.

It is an object of the present invention to provide a novel method and means for indicating conditions or positions of a registering or condition responsive means.

Another object of the present invention is to provide novel indicating means and methods employing a capacity counter.

A further object of the present invention is to provide novel indicating means for visually indicating at a distance the position of a local indicating means.

A still further object of the present invention is to provide a novel method and means for recording the position of an indicating arm or other medium on a recording instrument.

Another and still further object of the present invention is to provide a novel method and means for indicating the cumulative total of a series of individual indications on a local indicating means.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawings, in which:

Figure 1 is a circuit diagram of an indicating apparatus embodying the novel features of the present invention; and Figure 2 is a diagrammatic view and circuit diagram of a modified form of the present invention.

The indicating apparatus diagramatically illustrated on Figure 1 of the drawings is arranged to record and indicate the intensity of an impact sound received and picked up by a microphone 10. The arrangement for recording the intensity of the sound picked up by the microphone 10 includes, in general, an amplifier and a vacuum tube voltmeter which will now be described.

The microphone 10 is connected to any conventional electronic audio amplifier 11 which is diagrammatically illustrated by a rectangle in Figure 1. The alternating current output of the amplifier 11 is fed into a coupling transformer 12 through the primary winding 13.

A vacuum tube voltmeter is coupled to the secondary winding 14 of the transformer 12 and this vacuum tube voltmeter includes an electron discharge device 15, which is preferably a combination rectifier and amplifier tube, such for example as a duo-diode triode tube. The tube 15 includes a heater or filament 16, a cathode 17, a pair of anodes 18 and 19 which together with the cathode 17 form the diode, a control grid 20, and an anode 21 which together with the cathode 17 form the triode. The anode 21 receives a positive bias from the high potential side of a suitable source of direct current, indicated as B+, through a conductor 22. The cathode 17 is connected through a potentiometer element 23 and a fixed resistance element 24 to the negative side of the same source of direct current, indicated at B—, through conductor 25. One side of the secondary winding 14 of the coupling transformer 12 is connected through a D. C. blocking condenser 26 to the anodes 18 and 19 which, as illustrated, are connected in parallel. The other side of the secondary winding 14 is connected to the cathode 17 through the movable contact arm 27 and the portion of the resistance element 23 which lies between the movable contact arm 27 and the cathode 17.

The condenser 26 is of such a value that the alternating current output of the amplifier 11 which passes through transformer 12 will also pass freely through condenser 26. A control grid 20 is connected through a resistance element 28 to the side of condenser 26 which is connected to the anode 18 and 19. Control grid 20 is also connected through a condenser 29 to the cathode side of secondary winding 14 of transformer 12.

In order to obtain the desired potential drop for operating a meter element 30 a pair of resistance elements 31 and 32 are connected in series between conductors 22 and 25. The meter element 30 is then connected between the midpoint between resistance elements 31 and 32 and the cathode 17 through conductors 33 and 34.

As is well known to those skilled in the art, resistance element 28 and condenser 29 determine the time constant of the circuit. It will furthermore be understood that the condenser 29 is the condenser in the vacuum tube voltmeter circuit upon which a charge is stored through the resistance 28 and the intensity of which charge is a function of the output of the amplifier 11 and thus a function of the intensity of the impact sound. The potentiometer element 23 is provided to permit zeroing of the meter element 30.

The meter element 30 has a pointer or arm 35 associated therewith which is angularly moved by movement of the meter element 30. For the purpose of describing the illustrated embodiment of the present invention shown in Figure 1, let it be assumed that the zero position of the meter element 30 is when the pointer 35 is in the position indicated by the dotted line in Figure 1.

Associated with the pointer or meter arm 35 are a plurality of elements 36 to 45, inclusive, which are arranged in an arc around the end of the arm 35 and which arc has a center of curvature coincident with the axis of rotation of the meter element 30. The elements 36 to 45, inclusive, are slightly spaced from the end 46 of the arm 35 and are so arranged that whenever the end 46 of the arm 35 lies opposite one of the elements 36 to 45, inclusive, a condenser is formed by that particular element and the end 46 of the arm 35. It will thus be understood that as the arm 35 moves from its zero position, as shown by the dotted line in Figure 1, a condenser is first formed with the element 36, then with the element 37, then with the element 38, etc., until it has reached its indicating position (as shown by the full line in Figure 1), which indicates the intensity of the impact sound picked up by the microphone 10. As shown in Figure 1, the sound just picked up by the microphone 10 has moved the arm 35 to a position where its end 46 lies opposite the element 42. In moving to this position it has successively formed seven individual condensers, and as will presently be explained, the capacity effect of these seven individual condensers is successively inserted in an oscillator circuit.

The elements 36 to 45 are preferably located to correspond to positions representing uniform increments of intensity of the sound picked up by the microphone 10. In other words, the vacuum tube voltmeter is calibrated by properly positioning the condenser elements 36 to 45.

Associated with the equipment just described is an oscillator circuit which includes an electron discharge device 47 of the multi-grid type. More specifically, the electron discharge device 47 includes a heater element or filament 48, a cathode 49, a control grid 50, a screen grid 51, a suppresser grid 52 and an anode 53. A bias resistor 54 is connected between the control grid 50 and the cathode 49. A tuned circuit including an inductance element 55 and a condenser 56 is connected through a suitable feed-back condenser 57 to the control grid 50, and to one side of a source of alternating E. M. F. through conductor 58. The midpoint of the inductance element 55 is connected to the cathode 49 of the electron discharge device 47. The anode 53 is connected through conductors 59, 60 and 61 to the other side of the source of alternating E. M. F. just referred to. The anode 53 is also connected through a choke coil 62 to screen grid 51 and through choke coil 62 and a feed-back condenser 63 to the cathode 49 and the midpoint on the reactance element 55. The anode 53 is also connected through a by-pass condenser 64 and conductor 65 to ground.

Associated with the oscillator tube 47 is a second electron discharge device 66 of the multi-grid type, and which will hereinafter be referred to as the "trigger tube." The trigger tube 66 includes a heating element or filament 67, a cathode 68, a control grid 69, a screen grid 70, a suppresser grid 71 and an anode 72. The suppresser grid 71 is connected to the cathode 68 and both of these are directly connected to the anode 53 of the oscillator tube 47 through conductors 60 and 59. It will thus be observed that the suppresser grid 71 and the cathode 68 are also connected to one side of the source of alternating E. M. F. The control grid 69 of the trigger tube 66 is connected through a condenser 73 and a high resistance leak 74 to the screen grid 51 of the oscillator tube 47. The filaments 48 and 67 of the tubes 47 and 66, respectively, are connected in series with a pair of resistance elements 75 and 76, the latter having a movable contact element 77 thereon which is directly connected through a conductor 78 to the screen grid 70 of the tube 66. The filaments 48 and 67 and the series connected resistance elements 75 and 76 are connected to a suitable source of alternating E. M. F., as shown on the drawings. The anode 72 of the trigger tube 66 is connected through the energizing coil 79 of the relay 80 to the lower side of the tuned circuits 55, 56. A condenser 81 is connected in parallel with the energizing winding 79 of the relay 80.

Relay 80 includes a movable contact arm 82 and a stationary contact point 83 which form a switch in an energizing circuit of a ratchet operating coil 84 and a battery or other suitable source of electrical energy 85. Associated with the coil 84 is a pawl arm 86 which is mounted for angular movement about the point 87 and which is spring biased downwardly by a tension spring 88. The pawl 86 projects into engagement with the teeth of a ratchet wheel 89 mounted for rotation about a point 90.

The trigger tube 66 is arranged so as to draw some current all of the time. When increased capacity is placed in the input circuit of the oscillator tube 47 by the condenser means formed by one of the elements 36 to 45, inclusive, and the end 46 of the arm 35, the oscillator tube 47 causes the tube 66 to draw a heavier plate current which in turn is sufficient to draw the movable arm 82 down into engagement with the stationary contact 83 of the relay 80. Closing of the contacts 82 and 83 causes current to be drawn through the energizing coil 84 of the pawl and ratchet mechanism which advances the ratchet wheel 89 one tooth in a clockwise direction as viewed in Figure 1 of the drawings. As the arm 35 on the meter element 30 moves from its zero position as indicated by the dotted line in Figure 1, it will cause capacity to be inserted into the input circuit of the oscillator tube 47 each time it passes one of the elements 36 to 45, inclusive. Thus, in advancing from its zero position to the position as shown by the full line in Figure 1, it has caused capacity to be inserted into the input circuit of the oscillator tube 47 seven times, and consequently, the oscillator tube has caused a "triggering" of the tube 66 seven times, which in turn has caused the ratchet wheel 89 to be advanced seven teeth. It will thus be apparent that the degree of advancement of the ratchet wheel 89 is a direct function of the range of sweep of the arm 35 on the meter element 30.

Associated with the ratchet wheel 89 is a holding pawl 91 which is mounted for angular movement about a point 92. This holding pawl 91 has a tail portion 93 which is associated with a coil 94 and is arranged to be drawn toward the coil 94 when the coil 94 is energized. Coil 94 is energized from a suitable source of electro-motive force 95 whenever the switch 96 is closed. The pawl 91 and the coil 94 form what will hereinafter be termed the "reset" mechanism. A tension spring 97 normally holds the pawl 91 in engagement with the ratchet wheel 89. Any suitable reset means may be provided for the movable element 30 which carries the arm 35 to provide a quick return. When the element 35 is reset, no registration is made by the oscillator as the plate 46 passes the plates 45 to 36 due to the rapid movement of the end portion 48 past the stationary portions 45 to 36.

Also associated with the ratchet wheel 89 is a stop member 98 having an abutment portion 99 which projects into a path of a pin 100 on the ratchet wheel 89. It is to be understood that a suitable spring tensioning arrangement is provided for the ratchet wheel for urging the ratchet wheel 89 in a counter-clockwise direction, such for example as a coil spring 89'. Whenever the switch 96 is closed, the pawl 91 is moved out of engagement with the ratchet wheel 89 and the wheel 89 will turn in a counter-clockwise direction until the pin 100 hits the abutment 99 on the stop member 98.

This arrangement enables a cumulative reading or indication of a series of successive indications by the arm 35 on the meter element 30. That is to say, assuming that the arm 35 advances to the position opposite the element 42, the ratchet wheel will be advanced seven teeth. Then assume that the arm 35 returns to its zero position and then advances to a position opposite the element 45. This will advance the ratchet wheel 89 five more teeth, showing a cumulative total of 12. The switch 96 is closed only when it is desired to return the ratchet wheel 89 to its zero position with the pin 100 against the abutment 99.

Any suitable sort of indicating means may be employed with ratchet wheel 89 to indicate the relative angular position thereof. One form of indicating means is diagrammatically shown in Figure 1, wherein the ratchet wheel 89 carries a contact arm 101 which is arranged to engage a series of stationary contacts only a portion of which, namely contacts 105 to 110 are illustrated. These contacts 105 to 110, inclusive, are connected to a series of lamps 115 to 120, respectively. The lamps 115 to 120 are energized from a suitable source of power 112 through conductors 123 and 124. Conductor 123 is connected in any suitable manner to arm 101, while conductor 124 is connected to one side of each of the lamps 115 to 120. In the illustrated embodiment of the invention in Figure 1, the meter element arm 35 has moved over opposite the seventh condenser element 42 which has caused the ratchet wheel 89 to advance to a position to energize lamp 113. All the remaining lamps are out due to the fact that their contact elements 105 to 107 and 109 to 110 are open circuited. It is to be understood that only a portion of the lamps representing positions assumed by meter arm 35 have been shown, although in practice such lamps are preferably employed.

A modified form of the present invention is illustrated in Figure 2 of the drawings. More particularly, the modified form of the present invention in Figure 2 provides a means for preventing fluttering of the meter arm 35 by disconnecting the condenser element associated with the meter arm immediately after the oscillator has caused a triggering of the tube 66.

A portion of the condenser elements 36 to 41 are shown in Figure 2. These elements are not, however, directly connected together as they were in Figure 1, but are rather each connected to a stationary contact element 132 to 137, respectively, of a group of relays 138 to 143, respectively. Each of these relays 138 to 143 have a second stationary contact 162 to 169, respectively, which are connected through variable condensers 150 to 155 to ground. Each of these variable condensers 150 to 155 have their capacity value adjusted so as to correspond to the capacity of the associated elements 36 to 41 with the meter arm 35. The movable arm of each of the relays 138 to 143 is normally biased to a position against their associated stationary contacts 132 to 137, respectively. Each relay 138 to 143 includes an energizing coil 156 to 161, respectively. One end of each of the solenoids 156 to 161, are connected to a suitable source of electrical energy 162 while the other end of each of the solenoids 156 to 161 are connected to stationary contacts 162 to 168, respectively, which are arcuately arranged on a panel 169. A contactor arm 170 is mounted on a shaft 171 which also carries a ratchet wheel 172. This ratchet wheel 172 is arranged to be moved simultaneously with the ratchet wheel 89, but it is not mounted on the same shaft 130, as is ratchet wheel 89, as diagrammatically shown in Figure 2.

In the embodiment of the invention shown in Figure 2, the control circuit of the relay 80 includes, in addition to the operating coil 84, a second operating coil 173 which is connected in series with the coil 84 and which is arranged to move a pawl 174 against the action of a biasing spring 175. While, for purposes of clarity, the elements are separated in Figure 2, from their associated ratchet wheels, it is to be understood that the pawl 174 is arranged to engage the teeth of the ratchet wheel 172 and move the same step by step in a clockwise direction as viewed in Figure 2. From an inspection of Figure 2, it will at once be noted that pawl 86 and pawl 174 are moved simultaneously by a flow of current through the operating coils 84 and 173 caused by the closing of the movable contact 82 of the relay 80.

The panel 169 carries a contactor ring 176 which is connected through the conductor 177 to the source of electrical energy 162. The movable arm 170 is arranged to continually ride in conducting relationship with the conducting ring 176 through the medium of a conducting foot 177. This conducting foot 177 is electrically connected to a second conducting foot 178 which is arranged to progressively engage stationary contacts 163 to 168 depending upon the position of the arm 170.

A reset mechanism (not shown) is provided for each of the ratchets 89 and 172 in Figure 2. The structural details of the reset mechanism form no part of the present invention, and any suitable form may be provided, such, for example, as the reset mechanism shown and described in connection with Figure 1. The operating coils of the reset mechanism, however, are diagrammatically illustrated in Figure 2, more specifically, the operating coil of the reset mechanism for ratchet wheel 89 is indicated at 179 and the operating coil of the reset mechanism for ratchet wheel 172 is indicated at 180. These coils are arranged to be energized by a battery or other suitable source of energy 181. As has previously been pointed out, means is also provided for returning the pointer 35. Any suitable mechanism may be provided for resetting the pointer 35. For purposes of diagrammatically illustrating the operating coil of the reset mechanism for the pointer 35, it is shown at 182. In Figure 1 of the drawings only one switch was provided for the reset mechanism. In the circuit of Figure 2 two switches are preferably provided, as at 183 and 184 for the obvious reason that the ratchet wheel 89 keeps a cumulative total of a series of successive movements of ratchet wheel 172 from its zero position. Switch 183 connects the reset coil 180 of ratchet wheel 172 and the reset coil 182 of the arm 35 to the battery 181. Switch 184 connects all three reset coils 179, 180 and 182 to the battery 181 to cause resetting of both ratchet wheels as well as the pointer 35 to their respective zero positions. It will thus be apparent that every time the meter arm 35 is returned to its zero position, ratchet wheel 172 is returned to its zero position. That is to say, while the ratchet wheel 89 and its associated mechanism is arranged to indicate the cumulative total of a series of successive readings by the meter arm 35, the ratchet wheel 172 is so arranged that the movable arm 170 is always opposite the stationary contact 163 when the meter arm 35 is opposite the condenser element 36. Similarly, when the meter arm 35 is opposite the condenser element 37, the movable arm 170 of the ratchet mechanism is opposite the stationary contact 164; etc.

As the meter arm 35 moves from condenser element 36 to condenser element 37, the movable arm 139 is in position against the stationary contact 133 and thus as the arm 35 comes opposite the condenser element 37 the increased capacity in the input circuit of the oscillator causes the trigger tube to energize the winding 78 of the relay 80. This closes the movable contact 82 of the relay 80 which causes energization of the operating coils 84 and 173. The associated pawl elements 86 and 174 cause the ratchet wheels 89 and 172 to advance to a position where their arms 131 and 170 engage contacts 103 and 164, respectively. It will be observed that when arm 170 moves into engagement with the contact 164, the operating coil 157 of relay 139 is energized, causing the movable contact thereof to move out of engagement with stationary contact element 173 into engagement with contact element 145. Since the value of the condenser 151 is the same as the value of the condenser formed by the condenser element 37 with the end 46 of the meter arm 35, the overall capacity in the input circuit of the oscillator is not changed, but it will be noted that any fluttering of the arm 35 can not cause any accidental triggering of the control circuit.

When the arm 35 moves from condenser element 37 to condenser element 38, an additional amount of capacity reactance will be inserted in the oscillator circuit by the end 46 of the arm 35 and the element 38. This will cause ratchet wheels 89 and 172 to advance one more tooth. As ratchet wheel 172 advances one more tooth, arm 170 moves out of engagement with contact 164 and into engagement with contact 165. As arm 170 leaves contact 164 relay 139 is de-energized and the movable contact element thereof moves back into engagement with the stationary contact 133. As the arm 170 moves into engagement with contact 165 the energizing coil 158 of relay 140 is energized, thus causing the movable contact element thereof to move out of engagement with contact 134 and into engagement with contact 146 to place condenser 152 into the oscillator circuit in the place of the capacity reactance provided by the end 46 of the arm 35 and the condenser element 38. Any subsequent fluttering of the arm 35 will not cause any accidental triggering of the control circuit.

In the illustrated embodiment of the present invention, the registering means is shown in the form of a microphone 10 and a vacuum tube voltmeter, while the indicator is shown in the form of a plurality of lamps which are arranged to be selectively energized, depending upon the intensity of the sound waves striking the microphone 10. It is to be understood, however, that the present invention may be employed with any suitable form of registering means and any suitable form of indicating means. It will further be understood that while the illustrated embodiment of the present invention shows the indicating apparatus as a counter for registering the cumulative value of one or more readings, this invention may be employed with a registering means where only a single condition or event occurs, and where the indicating means indicates the presence or absence of such condition or event.

While I have shown particular embodiments of my invention, it will, of course, be understood that I do not wish to be limited thereto, since many modifications may be made, and, I, therefore, contemplate by the appended claims to cover all such modifications as fall within the true spirit and scope of my invention.

I claim as follows:

1. The combination comprising an electron discharge oscillator having an input circuit and an output circuit, a load connected in said output circuit, capacity reactance means, said oscillator being operative by insertion of said capacity reactance means in said input circuit, a relay having a two position movable contact element, said capacity reactance means being connected to said input circuit through said relay when said movable contact element is in one position, a second capacity reactance means having substantially the same reactance value as the said first capacity reactance means, means for energizing the relay to move said contact element to its second position when said capacity reactance means is inserted in said input circuit, means for inserting said second capacity reactance means in said circuit and for removing said first capacity reactance means when said movable contact element is moved to said second position, whereby the inserted capacity reactance of said input circuit remains constant irrespective of the position of said relay, and means for inserting the first capacity reactance in said input circuit.

2. The combination comprising a meter having an element movable in response to the intensity of a condition to be measured, a plurality of electrically conducted elements opposite indicating positions on said movable element corresponding to predetermined uniform increments of intensity of the conditions to be measured, each element forming with said movable element a condenser of predetermined capacity reactance value whenever said movable element is positioned opposite thereto, counter means for registering the number of indicating positions swept by said movable element including the final position opposite which the movable element comes to rest, an oscillator circuit including an electron discharge oscillator having an input circuit and an output circuit, means for advancing said counter means whenever current of predetermined minimum value flows in said output circuit, a plurality of relays, one associated with each of said conducting elements, each of said relays having a pair of stationary contact elements, a movable contact element and energizing coil, said movable contact element being normally biased against one of said stationary contact elements and being movable upon energization of said coil to engagement with the other of said stationary contact elements, the movable element of each relay being connected together to one part of the input circuit of said oscillator, the stationary contact of each relay against which the movable element is biased being connected to its associated conducting element, a plurality of condensers, one for each of said conducting elements and each having a capacity reactance value substantially equal to the capacity reactance value of its associated conducting element when associated with said movable meter element, said other stationary contact of each relay being connected through one of said condensers to another part of said oscillator circuit, said electron discharge oscillator being biased to cause current of predetermined minimum value to flow in said output circuit each time capacity reactance is inserted in the input circuit by the positioning of said movable meter element opposite one of said conducting elements, means associated with said counter means for moving the movable relay element away from the first of said stationary contact elements to the other of said stationary contact elements associated with a particular conducting element immediately following the positioning of said movable meter element opposite said conducting element.

HAROLD W. SCHAEFER.